United States Patent [19]

Shu

[11] Patent Number: 4,982,142

[45] Date of Patent: Jan. 1, 1991

[54] CIRCUIT FOR CONTROLLING THE SPEED OF A MAGNETIC TAPE REEL MOTOR OF AUDIO RECORDING/PLAYING MECHANISM AND METHOD THEREFOR

[75] Inventor: Jung-Hoon Shu, Seoul, Rep. of Korea

[73] Assignee: SamSung Electronics Co., Ltd., Kyung Ki-Do, Rep. of Korea

[21] Appl. No.: 503,897

[22] Filed: Apr. 4, 1990

[30] Foreign Application Priority Data

Apr. 4, 1989 [KR] Rep. of Korea ............... 1989-4462

[51] Int. Cl.$^5$ .............................................. H02P 5/00
[52] U.S. Cl. ................................... 318/268; 388/811; 388/810; 318/69
[58] Field of Search ............... 388/801, 802, 804, 805, 388/810, 811, 812, 813, 819, 820, 845, 902, 911; 318/268, 270, 271, 55, 58, 59, 66, 68, 69, 618, 606

[56] References Cited

U.S. PATENT DOCUMENTS

| | | | |
|---|---|---|---|
| 4,078,193 | 3/1978 | Anderson et al. | 388/810 |
| 4,155,033 | 3/1979 | DeBell et al. | 388/810 |
| 4,218,735 | 8/1980 | McCutcheon | 388/810 X |
| 4,471,281 | 9/1984 | Uezumi et al. | 318/606 |
| 4,623,827 | 11/1986 | Ito | 388/810 |
| 4,749,927 | 6/1988 | Rodal et al. | 388/810 X |
| 4,910,448 | 3/1990 | Tomisawa et al. | 388/804 X |

*Primary Examiner*—William M. Shoop, Jr.
*Assistant Examiner*—A. Jonathan Wysocki
*Attorney, Agent, or Firm*—Robert E. Bushnell

[57] ABSTRACT

A circuit for controlling the speed of a magnetic tape reel motor of an audio signal recording/playing mechanism. The circuit is based on the fact that the reel revolution period varies at a constant rate per revolution. The circuit measures the frequency generating value of the tape reel motor running at the normal speed to generate the ideal pulse value of the normally running motor as the initial reference value. Then the tape reel motor is run at the speed of N times the normal speed. The output of constant value means is added to the initial reference value to obtain the ideal pulse value. The present frequency generating value measured is compared with the ideal pulse value, which result is used to increase or decrease the applied voltage of the tape reel motor.

2 Claims, 6 Drawing Sheets

CIRCUIT FOR CONTROLLING THE SPEED OF A MAGNETIC TAPE REEL MOTOR OF AUDIO RECORDING/PLAYING MECHANISM AND METHOD THEREFOR

BACKGROUND OF THE INVENTION

The present invention concerns a circuit for controlling the speed of a magnetic tape reel motor of an audio recording/playing mechanism and method therefor.

Generally, a data recording/playing mechanism using a magnetic reel tape controls the running speed of the tape reel by using the capstan motor. When the tape runs at a high speed as in fast forwarding or rewinding, the capstan motor is not proper to use and a reel is used, instead. Meanwhile, the mechanism for recording/playing digital data on/from a digital audio tape (DAT) by using a rotational head should read precisely the data recorded on the tape running at a high speed so as to perform high speed search. To this end, the relative speed between the tape running speed and the peripheral speed of the rotational head must be constant both at the normal and high tape speeds.

Figure 1:
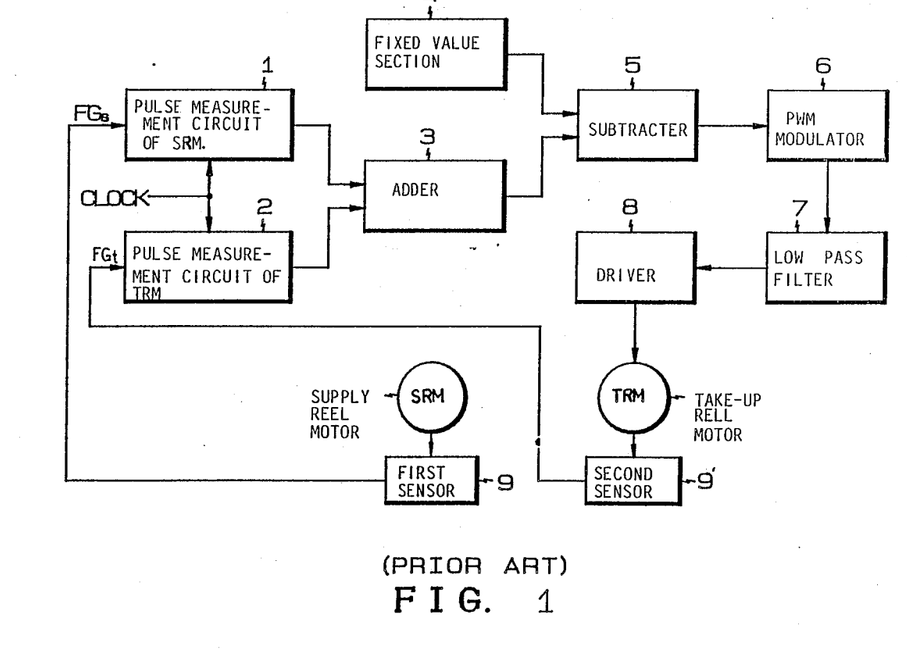
FIG. 1 is a block diagram of the conventional circuit for controlling the speed of a magnetic tape reel motor.
Figure 2:
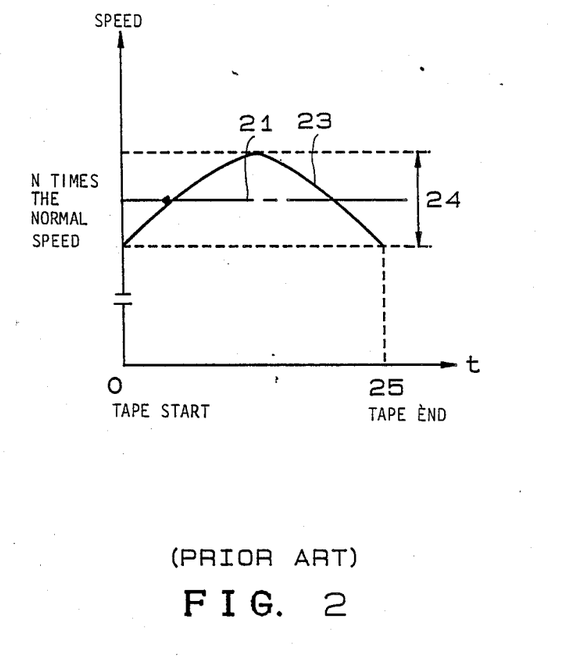
FIG. 2 is a graph for illustrating the characteristics of the conventional circuit.

Further, the tape must run at a constant high speed, so that the reliability of retrieving data from the tape is increased, and the peripheral speed of the rotational head is easily controlled to maintain a constant relative speed. However, to control the tape running speed through control of the reel, it must be first considered that the amount of the tape wound around the reel is continuously changing, and thus the tape running distance per reel revolution is also varying continuously. Hence, the speed of the reel revolution must be continuously changed to keep the tape running speed constant. To this end, the conventional reel control method changes the reel revolution speed so as to make constant the sum of the revolution periods of the supply and take-up reels. In this case, the reel tape running speed varies as shown in FIG. 2 (See the curve 23), so that the data retrieval reliability is worsened at the high speed than at the normal speed [See FIG. 2 (21)] and control of the drum revolution speed for keeping the constant relative speed becomes difficult.

SUMMARY OF THE INVENTION

It is an object of the present invention to provide a method for controlling the reel revolution speed to keep the tape running at a constant high speed for precise high speed data searching.

It is another object of the present invention to provide a circuit for practicing high speed data search in a digital audio tape.

The present invention is originally based on the fact that the reel revolution period varies at a constant rate per revolution.

According to an aspect of the present invention, a circuit for controlling the speed of a magnetic tape reel motor of an audio recording/playing mechanism includes:

a sensor for sensing the frequency generating (FG) signals of the reel motor;

a frequency divider for dividing clock pulses by an integer;

a first multiplexer for selecting as a measuring pulse the clock pulses or the output signals of the frequency divider according to the signal inputted through a first selecting terminal SE from a microcomputer;

means for measuring the period of the FG signals according to the measuring pulse of the first multiplexer;

constant value means for producing a quotient ($\Delta t/N$) resulting from the division of the period variance ($\Delta t$) of the FG signals occurring at each revolution of the magnetic tape reel by a multiple value when the reel runs at a normal speed;

a period counter for counting a period by adding the ideal period value $B_1$ of the reel and the output $A_1$ of the constant value means;

a second multiplexer for selecting one of the outputs of the FG period measuring means and period counter according to the selecting signal inputted through second selecting terminal from the microcomputer;

a latch circuit for latching (temporary storing) the output signal of the second multiplexer according to the clock pulses to provide the period counter with the ideal period value;

a subtractor for obtaining the tape running speed deviation by subtracting the output value of said latch circuit from the output value of said FG period measuring means;

a pulse width modulator for modulating the width of the clock pulses according to the deviation;

a low-pass filter for passing the output of the pulse width modulator converted into direct current;

a first rheostat for providing a reference offset voltage added to the deviation correction voltage from said low-pass filter when the tape running speed is N times the normal speed;

a second rheostat for providing another reference offset voltage when the tape running speed is normal;

an adder for adding the reference offset voltage of the first rheostat and the deviation correction voltage of the low-pass filter;

a switch for selecting the output of the adder or the above another offset voltage of the second rheostat; and a driver for driving the output of the switch to control the tape reel motor.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

Figure 3:
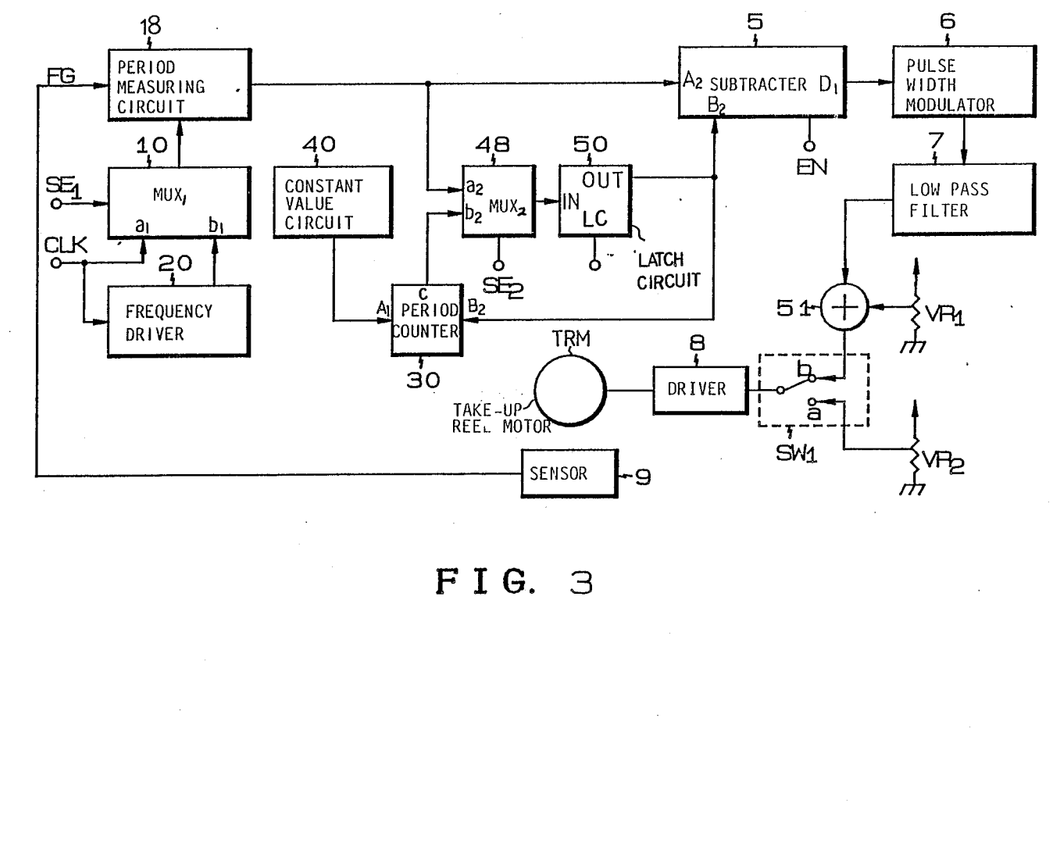
FIG. 3 is a block diagram illustrating the inventive circuit.

Referring to FIG. 3, sensor 9 senses the revolution of takeup reel motor TRM to generate frequency generating (FG) signals. A frequency divider 20 receives clock pulses for measuring the FG signals to divide them by an integer N. First multiplexer 10 selects as a measuring pulse the clock pulses or the output signals of the frequency divider 20 according to the signal inputted through first selecting terminal $SE_1$. Measuring circuit 18 measures the period of the FG signals according to the measuring pulse of the first multiplexer 10. Constant value circuit 40 produces a quotient $\Delta t/N$ resulting from the variance $\Delta t$ of the FG signals occurring at each revolution of the magnetic tape reel divided by a integer N when the reel runs at a normal speed. A period is counted in counter 30 by adding the ideal period value $B_1$ of the reel and the output $A_1$ of the constant value circuit 40. Second multiplexer 48 selects one of the outputs of the FG period measuring circuit 18 and period counter 30 according to the selecting signal inputted through second selecting terminal $SE_2$. A latch circuit 50 latches (temporarily stores) the output signal of the second multiplexer 48 according to the clock pulses to provide the period counter 30 with the ideal period value $B_1$. A subtractor 5 obtains the tape running speed deviation $C_2$ by subtracting the output value $B_2$ of the latch circuit 50 from the output value $A_2$ of the FG period measuring circuit 18. A pulse width modulator (PWM) 6 modulates the width of the clock pulses according to the deviation. A low-pass filter 7 passes the output of the PWM 6 converted into direct current.

First rheostat $VR_1$ provides a reference offset voltage added to the deviation correction voltage from the low-pass filter 7 when the tape running speed is N times the normal speed. Second rheostat $VR_2$ provides another reference offset voltage when the tape running speed is normal. An adder 51 adds the reference offset voltage of the first rheostat $VR_1$ and the deviation correction voltage of the low-pass filter 7. A switch $SW_1$ selects the output of the adder 51 or the another offset voltage of the second rheostat $VR_2$. A driver 8 drives the output of the switch $SW_1$ to control the tape reel motor.

Figure 4A:
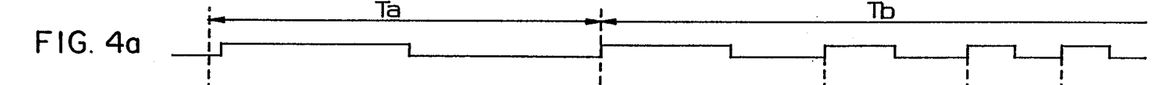
FIG. 4 illustrates the waveforms concerning the timing operation of the inventive circuit.
Figure 4B:
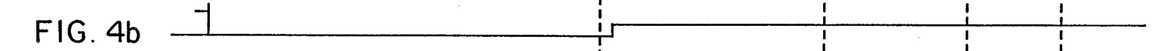
Figure 4C:
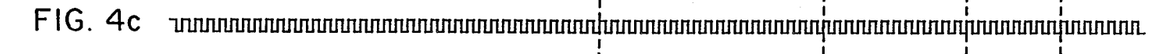
Figure 4D:
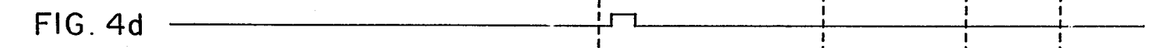
Figure 4E:
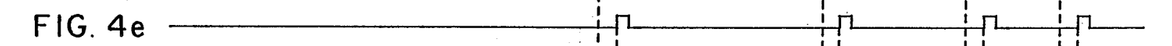
Figure 4F:
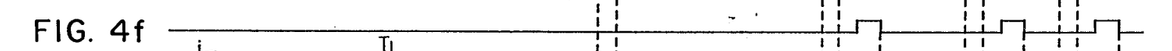
Figures 4G, 4H:
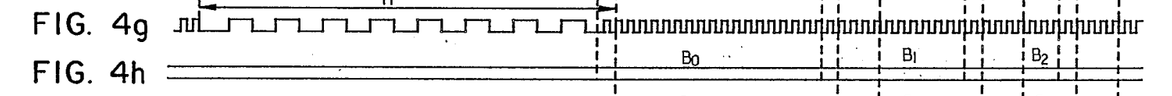
Figure 4I:
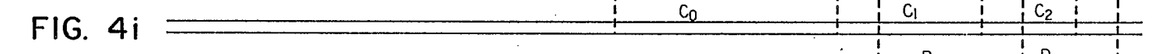
Figures 4J, 4K:
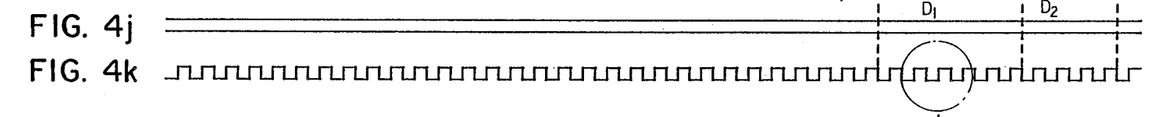
Figure 4L:
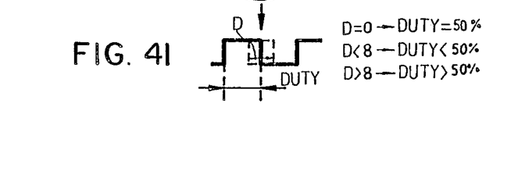

Referring FIG. 4, 4a illustrates the FG signal waveform produced form the revolution of the take-up reel motor (TRM) which is sensed by the sensor 9, 4b the input signal waveform of the first selecting terminal $SE_1$, 4c the measuring clock pulse waveform of the clock terminal CLK, 4d the input signal waveform of the second selecting terminal $SE_2$, 4e the latch waveform inputted into the latch clock terminal LC of the latch circuit 50, 4f the signal waveform inputted into the enabling terminal EN of the subtractor 5, 4g the output waveform of the first multiplexer $MUX_1$, 4h the output waveform of the FG period measuring circuit 18, 4i the output waveform of the latch circuit 50, 4j the output waveform of the subtractor 5, 4k the output waveform of the PWM 6 and 41 one periodic portion of the 4k signal changed according to the output of the subtractor 5.

Figure 5:
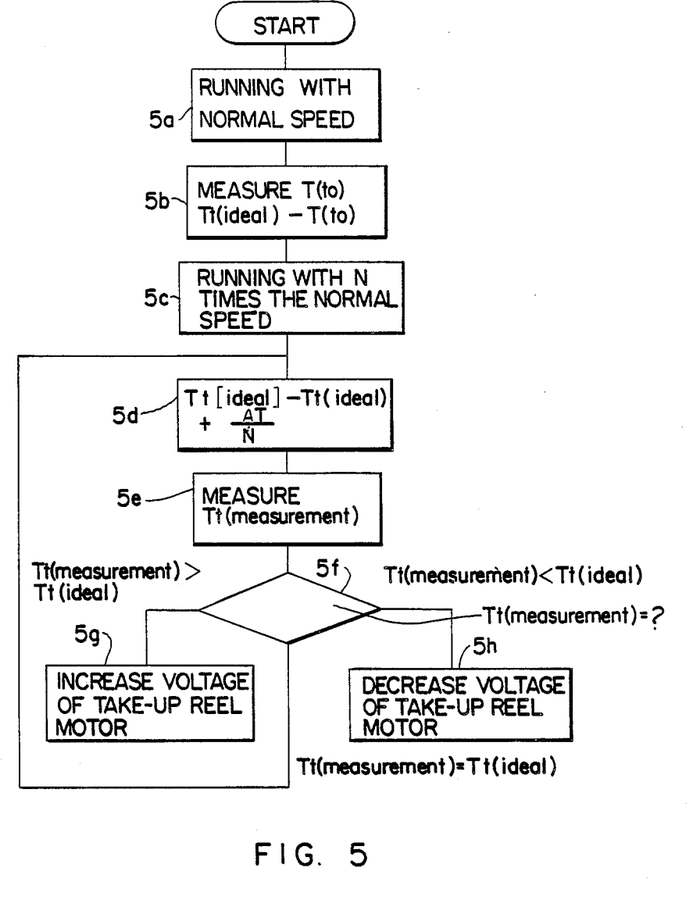
FIG. 5 is a flow chart illustrating the steps of the inventive method.

Referring FIG. 5, the inventive method includes the following steps:
measuring the frequency generating value [T(to)] of the tape reel motor running at a normal speed to generate the ideal pulse value [Tt(ideal)] of the normally running motor as an initial reference value;
selectively running the tape reel motor at the speed of N times the normal speed;
adding the output value ($\Delta t/N$) of the constant value circuit 40 to the initial reference value to obtain the ideal pulse value [Tt(ideal)];
measuring the present FG value [Tt(measurement)];
comparing the present FG value [Tt(measurement)] with the ideal pulse value [Tt(ideal)]; and
increasing the applied voltage of the tape reel motor when the present FG value [Tt(measurement)] is greater than the ideal pulse value [Tt(ideal)] or decreasing it when the condition is reversed.

Of course, the third to sixth of the above steps are repeated during the tape running at the speed of N times the normal speed.

Figure 6:
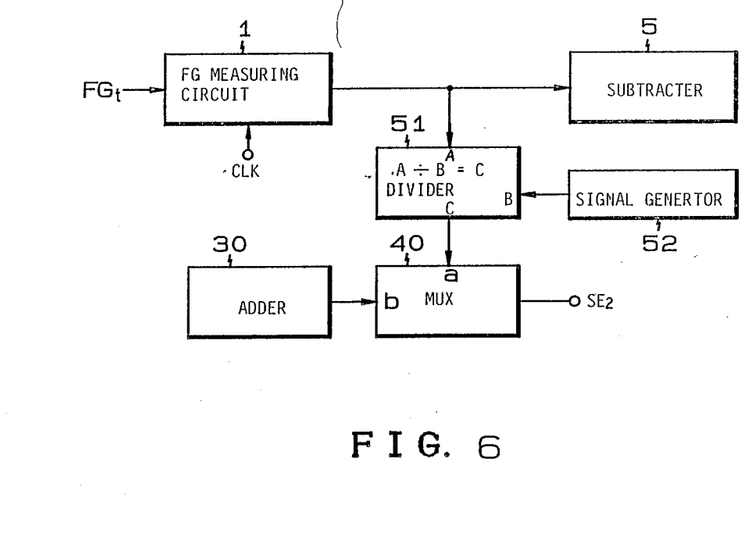
FIG. 6 is a block diagram illustrating another embodiment of the inventive circuit.

Another embodiment of the present invention will be described with reference to FIG. 6.

FG period measuring circuit 1 receives the FG signals as in the case of FIG. 4 and the clock pulses. The output of the circuit 1 is connected to one input terminal A of adder 51, whose other input terminal B is connected to signal generator 52 which generates the signal resulted from the division of the clock pulses by an integer N. The divider 51 outputs the signal A/B towards multiplexer 40. The other input terminal b of the multiplexer 40 is connected with adder 30, and the output of the FG period measuring circuit 1 is connected to subtractor 5, as in the case of FIG. 3.

With reference to FIGS. 3–5, there will be more specifically described an embodiment of the present invention. The present invention is based on the fact that the reel revolution period varies at a constant rate per revolution. The changing period of the reel revolution is determined on the normal running speed of the tape desired, whereby the speed of the reel revolution is controlled so as to keep the tape running at a constant high speed. Following is a brief explanation of the fact that the reel revolution period varies at a constant rate per revolution.

In an arbitrary state, assuming the radius of the take-up reel is $r_0$, the radius $r_1$ of the take-up reel after one revolution thereof is expressed by Equation (1).

$$r_1 = r_0 + \delta \quad (1)$$

Wherein $\delta$ is the thickness factor of the tape. Hence, the revolution period $T_0$ is expressed by Equation (2).

$$T_0 = 2\pi r_0/V_t \quad (2)$$

Wherein $V_t$ is the tape running speed. When the radius has become $r_1$ after one revolution of the reel, the period $T_1$ is expressed by Equation (3).

$$T_1 = 2\pi(r_0 + \delta)/V_t \quad (3)$$

Hence, the period difference $\Delta t$ after each revolution of the reel is obtained by Equation (4).

$$\Delta T = T_1 - T_0 = 2\pi(r_0 + \delta)/V_t - 2\pi r_0/v_t = 2\pi\delta/V_t \quad (4)$$

Namely, if the tape running speed $V_t$ is constant the revolution period of the take-up reel is increased by $2\pi\delta/V_t$ per reel revolution.

Hence, in order to change the present normal speed mode into the N times the normal speed mode, the ideal reference value at the normal speed is to be established by measuring the period of the take-up reel revolution at the normal speed. To this end, the switch $SW_1$ is put into position "a" according to the control signal generated from the microprocessor (not shown), the first selecting terminal $SE_1$ is put into low state to select $b_1$, and the second selecting terminal $SE_2$ is put into the high state to select $a_2$. Here, the steps 5a and 5b in FIG. 5 are performed, so that there is provided through the switch $SW_1$ the offset reference voltage established by the second rheostat $VR_2$ at the normal speed. The output signal from the switch SW₁ is current-amplified through the driver 8, and applied to the take-up reel TRM. The tape running speed at the normal speed is normally controlled by the capstan motor (not shown). The rotation of the take-up reel serves to pull with a proper force the tape released through the rotation of the capstan. The rotation of the take-up reel is sensed by the sensor 9 to generate the FG signals inputted into the FG period measuring circuit 18.

Meanwhile, when the first selecting terminal SE₁ is in the logic low state as shown by the waveform 4b in FIG. 4, the first multiplexer 10 selects the signals as shown by the interval T₁ of the waveform 4g resulting from the division of the measuring clock pulses by N in the frequency divider 20. The output of the first multiplexer 10 is applied to the FG period measuring circuit 18 to measure the FG signals of N times the normal speed as shown by 4a produced from the sensor 9. The FG period measuring circuit 18 measures the input signals by the measuring clock pulses as shown by the interval T₁ of 4g in the normal speed interval Ta of 4a, thereby outputting the signals as shown by B₀ of 4h.

The output of the circuit 18 is applied to the second multiplexer 48 and the subtractor 5. At this time, the second multiplexer 48 receives the logic high state signal as shown by 4d through the second selecting terminal SE₂ in the step 5b under the control of the microcomputer so that it selects the output 4h of the circuit 18 latched by the latch circuit 50 according to the latch clock pulses 4e. The output of the latch circuit 50 is applied into the period counter 30 and the subtractor 5.

When the period value [T(to)] of the normal speed is latched by the latch circuit 50 in the step 5b, the microcomputer controls the reel speed to N times the normal speed in the step 5c. Here, the first selecting terminal SE₁ receives the high signal as shown by 4b, the second selecting terminal SE₂ receives the logic low signal as shown by 4d, and the switch SW₁ is shifted into the position b. The offset reference voltage for the running speed of N times the normal speed is applied from the first rheostat VR₁ to the adder 51, whose output signal is driven by the driver 8, applied to the take-up reel motor TRM. Then the take-up reel motor TRM is driven to generate the FG pulses sensed by the sensor 9 as shown by the interval T_b of 4a. The FG signal is inputted into the FG measuring circuit 18, which measures in the step 5e the FG pulses of 4a for the reel speed of N times the normal speed by the clock pulses of 4g selected by the first multiplexer 10.

The constant value circuit 40 produces a quotient Δt/N resulting from the division of the period variance in the FG signals occurring at each revolution of the reel by N when the reel runs at a normal speed. The quotient Δt/N and the output of the latch circuit 50 are added in the step 5d in FIG. 5 by the period counter 30, and applied to the second multiplexer 48. Accordingly, the latch circuit 50 latches the output of the second multiplexer 48 according to the latch clock pulses of 4_e to produce the ideal pulse value [Tt(ideal)] of the take-up reel motor TRM as shown in the step 5d towards the subtractor 5. The subtractor 5 subtracts in the step 5f the value C₁ of the output 4ᵢ of the latch 50 from the value B₁ of the output 4h of the circuit 18. In the step 5f, if the output value [Tt(measurement)] of the circuit 18 equals to the ideal value [Tt(ideal)] of the latch circuit 50, the pulse width of the output of the PWM 6 is not changed, and thus the voltage applied to the take-up reel motor TRM is not changed, so that the processing steps are repeated from the step 5d. However, if the value [Tt(measurement)] is greater than the ideal value [Tt(ideal)], the pulse width of the output of the PWM 6 is increased. Accordingly, the DC level of the output of the low-pass filter 7 is increased, which increases the output of the adder 51 so as to increase the voltage applied to the take-up reel motor TRM. Namely, the output waveform 4j of the subtractor 5 is changed into the waveform 4k through the PWM 6, which waveform 4k is specifically depicted as waveform 4l to increase the applied voltage. If the value [Tt(measurement)] is less than the ideal value [Tt(ideal)], the applied voltage of the take-up reel motor TRM is decreased as shown in 4ₗ in the step 5h. Namely, after the period of the reel revolution is measured at the normal running of the capstan motor, the selecting switch SW₁ is shifted into the mode of controlling N times the normal speed and also the FG(Tt) clock pulses are changed (SE₁=high). Further, SE₂ of the second multiplexer 48 is put into the logic low state to select the output of the period counter 30. After shifting into the mode of N times the normal speed, the FG signal is measured according to the FG measuring clock pulses, while the FG(Tt) measured according to the N-divided clock pulses at the normal speed is applied to the period counter 30 from the latch circuit 50, added to the output Δt/N (difference of Tt per revolution at the speed of N times the normal speed) of the constant value means 40. When the measurement of FG(Tt) is completed, the output of the period counter 30 is applied to the second multiplexer 48, then latched by the latch circuit 50.

Subsequently, the FG(Tt) measurement after the mode of N times the normal speed and the output value (ideal value of Tt at the speed of N times the normal speed in the present position) of the latch circuit 50 are applied to the subtractor 5 for comparing. In this case, if the output value D₁ of the subtractor 5 having the waveform 4j in FIG. 4 is negative, the FG(Tt) measurement B₁ of the waveform 4h is less than C₁ of 4ᵢ (ideal value of Tt at the speed of N times the normal speed in the present position) which is the output of the latch circuit 50, which means the reel revolution speed being too high. Hence, the duty cycle of the clock pulses produced from the PWM 6 becomes less than 50% so as to reduce the output of the adder 51 which adds the output of the low-pass filter 7 and the offset reference value of N times the normal speed. Thus, the voltage applied to the TRM is reduced to reduce its speed. Conversely, if the output value D₁ of the subtractor 5 having the waveform 4j is positive, the reel speed is slower than the ideal speed of N times the normal speed. Hence, the duty cycle of the clock pulses produced from the PWM 6 becomes more than 50% so as to increase the voltage applied to the TRM, thereby accelerating the reel revolution speed. Further, if the output value D₁ of the subtractor 5 having the waveform 4j becomes zero, the duty cycle of the clock pulses of the PWM 6 is made to have 50% so as to maintain the present state. Thus, the above processing steps are continuously repeated at each revolution of the take-up reel during the mode of N times the normal speed so as to continuously control the revolution speed of the take-up reel, thereby approaching the ideal speed of the take-up reel revolution.

As described above, the present invention controls precisely the reel revolution speed by employing the fact that the reel revolution period varies at a constant rate per revolution, thereby keeping the tape running at a constant high speed.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A circuit for controlling the speed of a magnetic tape reel motor of an audio signal recording/playing mechanism, said circuit comprising:

a sensor for sensing the rotation frequency of a tape reel motor and for generating frequency signals corresponding to said rotation of said tape reel motor;

a frequency divider for dividing clock pulses by an integer and for producing an output signal based on said division;

a first multiplexer connected to said clock pulses and said frequency divider for selecting for a measuring pulse said clock pulses or said output signal of said frequency divider according to a selection signal inputted through a first selecting terminal and for outputting said measuring pulse;

means for measuring the period of said frequency signals according to said measuring pulse of said first multiplexer and for generating an output indicative of said period;

constant value means for producing a quotient resulting from the division of the period variance of the frequency signals occurring at each revolution of said magnetic tape reel motor by a multiple value (N) when said tape reel motor runs at a normal speed;

a period counter for counting and outputting a period by adding an ideal period value of said tape reel motor and the quotient of said constant value means;

a second multiplexer for selecting one of the outputs of said period measuring means or said period counter according to a second selecting signal;

a latch circuit for latching (temporary storing) the output signal of said second multiplexer according to said clock pulses and for providing said period counter with said ideal period value;

a subtractor for obtaining the tape running speed deviation by subtracting the latched value of said latch circuit from the output value of said period measuring means;

a pulse width modulator connected to said subtractor for modulating the width of said clock pulses according to said deviation;

a low-pass filter connected to said modulator for passing the output of said pulse width modulator, converted into direct current;

a first rheostat for providing a first reference offset voltage;

adder means for adding said first reference voltage to the deviation correction voltage from said low-pass filter;

a second rheostat for providing a second reference offset voltage when the tape running speed is normal;

a switch means for selectively providing either the output of said adder or said second offset voltage of said second rheostat to a driver for controlling said tape reel motor.

2. A method for controlling the speed of a magnetic tape reel motor of an audio signal recording/playing mechanism, said method comprising the steps of:

measuring a rotation frequency value of the tape reel motor running at the normal speed to generate an ideal pulse value of the normally running motor as an initial reference value;

selectively running the tape reel motor at a speed of a predescribed times (N) the normal speed;

adding an output value ($\Delta t/N$, based on the period variance of said rotation frequency between each revolution divided by (N), of a constant value means to the initial reference value to obtain an ideal pulse value;

measuring a present frequency generating value;

comparing the present frequency generating value with the ideal pulse value; and selectively increasing the voltage applied to the tape reel motor when the present frequency generating value is greater than the ideal pulse value or decreasing applied voltage of the tape reel motor when the present frequency generating value is less than the ideal pulse valve.

* * * * *